(12) United States Patent
Gaitonde et al.

(10) Patent No.: US 11,321,054 B2
(45) Date of Patent: May 3, 2022

(54) SYSTEM AND METHOD FOR AUTOMATED SOFTWARE ENGINEERING

(71) Applicant: Xoriant Corporation, Sunnyvale, CA (US)

(72) Inventors: Girish Gaitonde, Saratoga, CA (US); Bhavesh Ved, Mumbai (IN); Shailesh Pardesi, Pune (IN); Yogesh Sharma, Pune (IN)

(73) Assignee: XORIANT CORPORATION, Sunnyvale, CA (US)

(*) Notice: Subject to any disclaimer, the term of this patent is extended or adjusted under 35 U.S.C. 154(b) by 0 days.

(21) Appl. No.: 16/914,046

(22) Filed: Jun. 26, 2020

(65) Prior Publication Data
US 2021/0405976 A1    Dec. 30, 2021

(51) Int. Cl.
*G06F 9/44*    (2018.01)
*G06F 8/33*    (2018.01)
(Continued)

(52) U.S. Cl.
CPC .............. *G06F 8/33* (2013.01); *G06F 8/75* (2013.01); *G06F 8/77* (2013.01); *G06F 11/3608* (2013.01); *G06N 20/00* (2019.01)

(58) Field of Classification Search
CPC .................................. G06F 8/33; G06N 20/00
(Continued)

(56) References Cited

U.S. PATENT DOCUMENTS 7,861,252 B2 * 12/2010 Uszok ................. H04L 67/10
                                                                719/317
8,584,090 B2    11/2013 Salehi
(Continued)

FOREIGN PATENT DOCUMENTS

WO    WO-2019207360 A1 * 10/2019 ........... G06F 3/0483
WO    WO2020127587 A1    6/2020

OTHER PUBLICATIONS

Philipp Hukal et al. "Bots Coordinating Work in Open Source Software Projects"; Computer (vol. 52, Issue: 9, Sep. 2019), IEEE.*
(Continued)

*Primary Examiner* — Francisco J Aponte
(74) *Attorney, Agent, or Firm* — Inventive Law Inc.; Jim H. Salter

(57) ABSTRACT

Systems and methods for automated software engineering are disclosed. A particular embodiment is configured to: establish a data connection with a software code repository; provide a collection of autonomous computer programs or bots configured to automatically perform a specific software development life cycle (SDLC) task; use a first bot of the collection of bots to perform an automatic code review of a software module from the software code repository; use a second bot of the collection of bots to perform automatic unit testing of the software module from the software code repository; and use a third bot of the collection of bots to perform an automatic deployment of the software module from the software code repository. A health engine module can monitor the execution of the other software modules and capture execution metrics. Any of the bots in the bot collection can be machine learning models trained using training data.

20 Claims, 13 Drawing Sheets

(51) Int. Cl.
  *G06N 20/00* (2019.01)
  *G06F 11/36* (2006.01)
  *G06F 8/77* (2018.01)
  *G06F 8/75* (2018.01)
(58) Field of Classification Search
  USPC .......................................................... 717/106
  See application file for complete search history.

(56) References Cited

U.S. PATENT DOCUMENTS

| | | | |
|---|---|---|---|
| 9,369,410 B2* | 6/2016 | Capper | H04L 51/02 |
| 10,075,442 B2 | 9/2018 | Simpson | |
| 10,250,539 B2 | 4/2019 | Simpson | |
| 10,257,143 B2 | 4/2019 | Simpson | |
| 10,417,115 B1* | 9/2019 | Klein | G06F 9/45512 |
| 10,977,157 B2* | 4/2021 | Bregman | G06F 9/54 |
| 10,977,166 B1* | 4/2021 | Jaganmohan | G06N 5/02 |
| 10,983,761 B2* | 4/2021 | Svyatkovskiy | G06F 16/9027 |
| 11,157,244 B2* | 10/2021 | Bodin | G06Q 10/101 |
| 2015/0378692 A1* | 12/2015 | Dang | G06F 8/33 717/106 |
| 2017/0039188 A1* | 2/2017 | Allen | G06F 40/169 |
| 2017/0147291 A1* | 5/2017 | Vega | G09B 19/0053 |
| 2017/0364352 A1* | 12/2017 | Cmielowski | G06F 8/71 |
| 2017/0371629 A1* | 12/2017 | Chacko | G06F 8/36 |
| 2018/0027006 A1* | 1/2018 | Zimmermann | H04L 63/0245 726/11 |
| 2018/0046570 A1* | 2/2018 | Kaulgud | G06F 11/3672 |
| 2018/0089591 A1* | 3/2018 | Zeiler | G06F 8/31 |
| 2018/0196731 A1* | 7/2018 | Moorthi | G06F 11/3664 |
| 2018/0218252 A1* | 8/2018 | Wu | G06N 3/006 |
| 2019/0079741 A1* | 3/2019 | Makkar | G06F 8/71 |
| 2019/0095756 A1* | 3/2019 | Agrawal | G06K 9/6269 |
| 2019/0114148 A1* | 4/2019 | Chakinam | G06Q 10/00 |
| 2019/0163560 A1* | 5/2019 | Purushothaman | G06F 11/3452 |
| 2019/0220253 A1* | 7/2019 | Pradhan | G06N 3/08 |
| 2019/0243617 A1* | 8/2019 | Stevens | G06F 8/42 |
| 2019/0317754 A1* | 10/2019 | Mosquera | G06Q 10/06316 |
| 2020/0065891 A1* | 2/2020 | Kapoor | G06Q 30/08 |
| 2020/0097261 A1* | 3/2020 | Smith | G06N 3/0454 |
| 2020/0097388 A1* | 3/2020 | Bhat | G06F 17/18 |
| 2020/0104346 A1* | 4/2020 | Ananthapur Bache | H04L 67/22 |
| 2020/0159499 A1* | 5/2020 | Bodin | G06N 20/00 |
| 2020/0159950 A1* | 5/2020 | Bodin | G06F 8/33 |
| 2020/0160458 A1* | 5/2020 | Bodin | G06F 21/31 |
| 2020/0241872 A1* | 7/2020 | Muddakkagari | G06F 16/903 |
| 2020/0249919 A1* | 8/2020 | Makkar | G06F 8/36 |
| 2020/0285636 A1* | 9/2020 | Liu | G06F 16/243 |
| 2020/0371756 A1* | 11/2020 | Oburu | G06Q 10/06375 |
| 2020/0409693 A1* | 12/2020 | Song | A63F 13/65 |
| 2021/0042110 A1* | 2/2021 | Basyrov | G06F 40/284 |
| 2021/0157560 A1* | 5/2021 | Orozco | G06F 11/3688 |

OTHER PUBLICATIONS

Dr.T.Geetha et al; "Robotic Process Automation"; International Journal of Computer Techniques—vol. 7 Issue 5, 2020.*

Inna Bedny; "Application of systemic-structural activity theory to the design of BOTs and AI software"; Human-Intelligent Systems Integration—Feb. 19, 2021.*

Divanshi Priyadarshni Wangoo; "Artificial Intelligence Techniques in Software Engineering for Automated Software Reuse and Design"; 2018 4th International Conference on Computing Communication and Automation (ICCCA).*

Ritu Kapur; "Towards a Knowledge warehouse and expert system for the automation of SDLC tasks"; 2019 IEEE/ACM International Conference on Software and System Processes (ICSSP).*

A.R.V. Anthony et al. "Software Development Automation: An Approach to Automate the Processes of SDLC"; International Journal of Computer Applications (0975-8887) vol. 175—No. 37, Dec. 2020.*

Ahmad Abdellatif et al.; MSRBot: Using bots to answer questions from software repositories; Empirical Software Engineering (2020) 25:1834-1863. Data-Driven Analysis of Software (DAS) Lab, Department of Computer Science and Software Engineering, Concordia University, Montreal, QC H3G 1M8, Canada.*

* cited by examiner

SYSTEM AND METHOD FOR AUTOMATED SOFTWARE ENGINEERING

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2019-2020 Xoriant Corporation, All Rights Reserved.

TECHNICAL FIELD

This patent application relates to computer-implemented software systems, according to one embodiment, and more specifically to a system and method for automated software engineering.

BACKGROUND

With the progression in software engineering processes and software-implemented technologies, continuous improvement has become a need when it comes to the Software Development Life Cycle (SDLC). There are at least two main challenges to face while following the tasks and processes defined in most software development life cycles. The first challenge is to ensure that standards laid down are followed so that the cost of rework is minimized and defect leakage to next phases of the cycle is minimal. The second challenge is to automate as much of the SDLC as possible. However, such automation in conventional SDLC systems has proven to be very difficult to implement.

Agile software development demands speed and quick response to changing requirements. However, pressure to meet these demands for rapid development can cause software engineers to focus on completing tasks that minimally meet the requirements. Code reviews, code quality, unit testing, efficient deployment, auditing, version tracking, and automation are often sacrificed for the speed of development and deployment. In addition, developers with varied skills and capabilities need to be guided and trained on best software engineering practices to build robust software products. This developer guidance requires continuous training and coaching. These time-consuming, but critically important, parts of the SDLC can create problems and liabilities later if these tasks are not completed in a timely and appropriate manner. For example, software developers, quality assurance (QA) engineers, and software deployment specialists who work in a rapid software development and deployment environment can be greatly challenged by compressed schedules. Generating code, writing test cases, generating test data, executing test cases, creating software builds, and testing interfaces are some of the time-consuming, but critical, tasks that must be completed on time. Without enough time and efficient automation tools, software developers, QA engineers, and software deployment specialists must focus on immediate milestones and sacrifice a focus on functionality. As a result, a 'Technical Debt' is created that must be removed or mitigated over a period of time.

SUMMARY

In various example embodiments described herein, a system and method for automated software engineering is disclosed. In the various example embodiments described, a computer-implemented tool or software application (app) as part of an automated software engineering system is described to automate and improve the SDLC. As described in more detail below, a computer or computing system on which the described embodiments can be implemented can include any type of computing, data processing, communication, networking, or electronic system capable of executing software.

In various example embodiments described herein, the automated software engineering system provides a series of automated processes to facilitate and enhance the various phases of the SDLC. As a result, the example embodiments enable a "shift left" approach to software development, testing, and deployment. In the "shift left" approach, unit testing and system testing of software can be performed earlier in the lifecycle and more often throughout the lifecycle. This approach leads to better software products with less lifecycle costs. In a particular example embodiment, the automated processes can be implemented as bots or autonomous computer programs on a computer system or network that can interact with computer system processes or users. In the particular example embodiment, the bots can be implemented using machine learning techniques, trained deep neural networks, classifiers, or other types of trainable execution models. Bots are particularly well-suited to reacting quickly to a specific and dynamic SDLC environment. Also, given the automation provided by the bots of an example embodiment, the various phases of the SDLC can be implemented around the clock thereby improving the quality of software being developed and speeding the SDLC to earlier completion.

In an example embodiment of the automated software engineering system, the conventional SDLC processes can be integrated with a collection of bots, which span across each phase of the SDLC. The use of automation and bots enables continuous code inspection, testing and deployment. The automated software engineering system of an example embodiment can automate repetitive tasks, implement model processes and best practices, validate work performed by human engineers, and enable the use of automated tools and technology for different phases of the SDLC. Details of the various example embodiments are disclosed in more detail below.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In various example embodiments described herein, a system and method for automated software engineering is disclosed. In the various example embodiments described herein, a computer-implemented tool or software application (app) as part of an automated software engineering system is described to automate and improve the development, design, testing, and deployment of software systems. As described in more detail below, a computer or computing system on which the described embodiments can be implemented can include any type of computing, data processing, communication, networking, or electronic system capable of executing software.

In various example embodiments described herein, the automated software engineering system provides a collection of automated processes or bots to facilitate and enhance the various phases of the SDLC. In a particular example embodiment, the automated processes can be implemented as bots or autonomous computer programs on a computer system or network that can interact with computer system processes or users. In the particular example embodiment, the bots can be implemented using machine learning techniques, trained deep neural networks, classifiers, or other types of trainable execution models. Bots are particularly well-suited to reacting quickly to a specific and dynamic SDLC environment. Also, given the automation provided by the bots of an example embodiment, the various phases of the SDLC can be implemented around the clock thereby speeding the SDLC to earlier completion.

In an example embodiment of the automated software engineering system, the conventional SDLC processes can be integrated with a collection of bots, which span across each phase of the SDLC. The use of automation and bots enables continuous code inspection, testing and deployment. The automated software engineering system of an example embodiment can automate repetitive tasks, implement model processes and best practices, validate work performed by human engineers, and enable the use of automated tools and technology for different phases of the SDLC.

Figure 1:
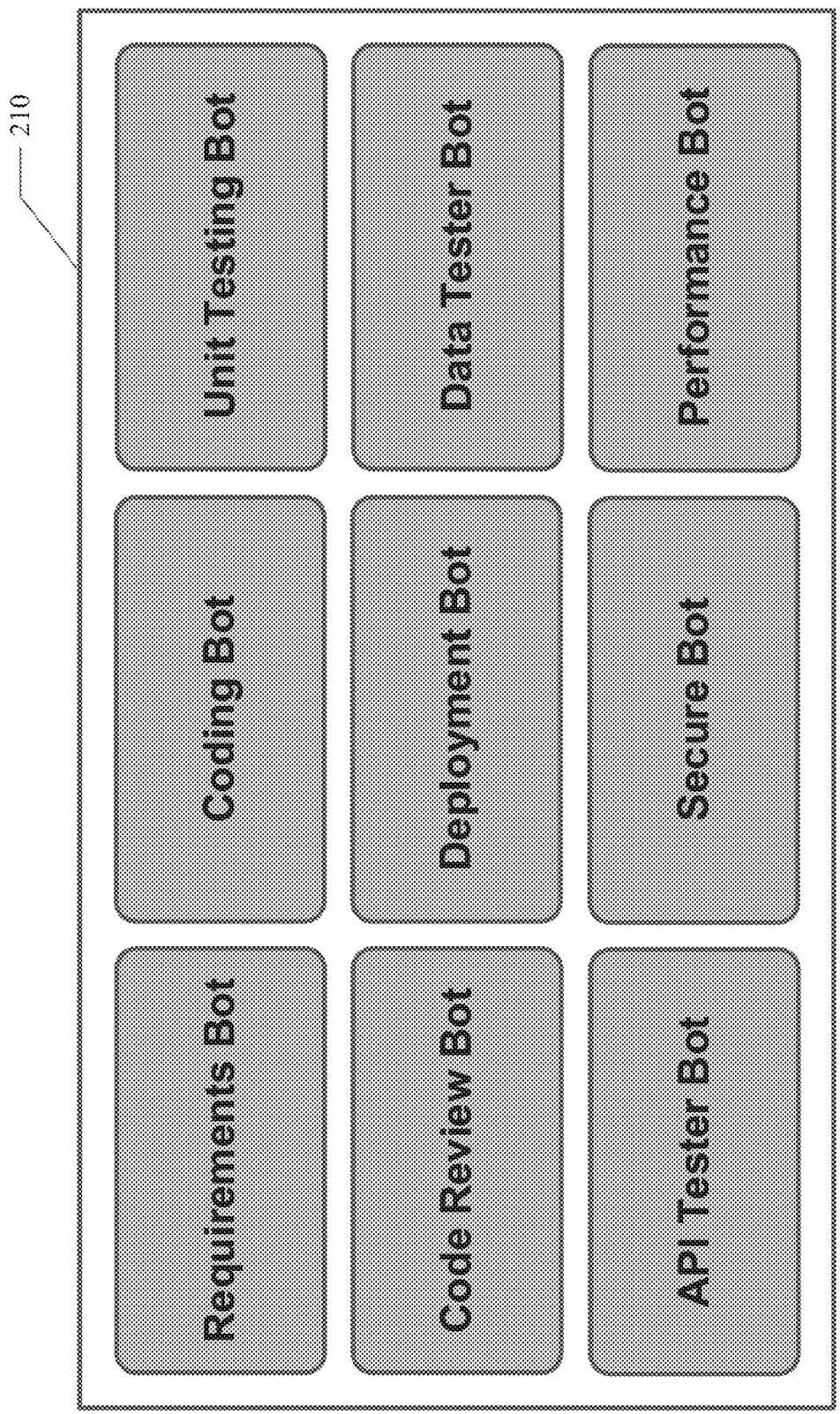
FIG. 1 illustrates a collection of bots that may be used in an example embodiment.

FIG. 1 illustrates a collection of bots 210 of an example embodiment of the automated software engineering system as disclosed herein. Each of these bots in the collection of bots 210 is described in more detail below along with the automated software engineering system 200 in which the bots 210 are executed and managed. A typical SDLC includes several phases: 1) a software design and coding phase, 2) a software testing phase, and 3) a software system deployment phase. It will be apparent to those of ordinary skill in the art that additional SDLC phases can also be implemented using the techniques described herein. In the example embodiment, the software design and coding phase represents a phase wherein software executables and data structures are designed to a particular requirements specification and implemented in a particular programming language(s). To support this phase, the example embodiment can provide one or more bots to automate portions of the software requirements analysis, design, and coding phase. For example, the example embodiment can provide a requirements bot, a coding bot, a code review bot, and a secure bot. The requirements bot can be configured to automatically scan a software requirements specification for completeness, consistency, and standards compliance. The coding bot can be configured to automatically scan coded software modules for standards compliance, appropriate data definitions, case and branch handing, exception handling, variable or symbol mismatches, parameter range checking, non-initialized variables, and the like. The coding bot can also be configured to automatically generate executable code. As shown in FIG. 1, another bot can be provided to perform code review and coding style checking on completed software modules. Other bots can be provided to perform an analysis on completed software modules pertaining to a level of compliance with security standards or practices. In each case, the bots can be configured as rule-based automated processing modules or trained machine learning automated processing modules. The training of the machine learning, neural network, or classifier bots is described in more detail below. The bots supporting the software design and coding phase of the SDLC can analyse completed software modules or automatically generate executable code in serial or in parallel and may be executed around the clock to significantly speed up the automatic generation and validation of the designed and coded software modules during the software design and coding phase.

Referring still to FIG. 1 for an example embodiment, the software testing phase of the SDLC can also be supported by a collection of automated testing bots. The testing phase is intended to perform a battery of tests on completed software modules that have been validated by the software design and coding phase as described above. One tedious and error-prone task of the testing phase is the generation of test cases and test data to stress the functionality and implementation of the validated software modules by executing the test cases and capturing output produced by the software modules under test. This output must be compared against benchmarks or acceptable output definitions. The software modules not complying with testing standards are flagged and automatic notifications or alerts can be generated. Then, each software module under test can be evaluated and test results can be recorded and/or communicated. In an example embodiment, a data tester bot and an application programming interface (API) tester bot can be provided to evaluate the software modules and interfaces under test against applicable code review standards or desired profile definitions. As in the software design and coding phase, the bots used in the testing phase can be configured as rule-based automated processing modules or trained machine learning automated processing modules. The bots supporting the software testing phase of the SDLC can automatically generate test cases, test data, test sequencing, and can automatically run the test sequences against software modules under test in serial or in parallel. The performance of each of the software modules under test can be evaluated and recorded. The testing phase bots may be executed around the clock to significantly speed up the automatic testing of the designed and coded software modules during the software testing phase.

Referring still to FIG. 1 for an example embodiment, the software deployment phase of the SDLC can also be supported by a collection of automated deployment bots. The deployment phase is intended to assemble multiple validated and tested software modules into a functional and operable software system. The analysis and validation of interfaces between the plurality of modules of the software system is a key part of this phase of the SDLC. An example embodiment can provide automated bots to analyse and test these interfaces, including the APIs as in the testing phase. The interfaces can be tested and evaluated by the bots for accuracy and efficiency. Metrics can be automatically captured by bots to determine speed, throughput, capacity, and other performance metrics of the integrated software system. Bots can also evaluate the functionality, operation, and efficiency of the software system against pre-established requirements parameters. As in the software design and coding phase and the testing phase, the bots used in the deployment phase can be configured as rule-based automated processing modules or trained machine learning automated processing modules. The bots supporting the software deployment phase of the SDLC can automatically generate interface test scenarios, interface test sequencing, and can automatically run interface tests with groups or sub-groups of software modules under test in serial or in parallel. The performance of each of the groups of software modules under test can be evaluated and recorded. The deployment phase bots may be executed around the clock to significantly speed up the automatic testing of the software system during the software deployment phase.

It is important for software project managers and senior management to know about the status of the development and deployment of a particular software system project without getting into the low-level details. The various example embodiments described herein calculate the health and status of the software system project based on various metrics. The various example embodiments can also predict the health and status based on the domain, technology, requirements and the reported issues. The various example embodiments can also provide an estimated timeline to complete the software system project. In particular, the example embodiments can provide: Quantitative project management, including: 1) Process metrics—defect metrics, velocity (team vs. individuals), and delivered vs. committed percentages, 2) Code metrics—technical debt, maintainability indices, code coverage, and complexity indices, and 3) Project Health—a combination of process metrics, code metrics, and utilization (human and financial) to calculate project health. The various example embodiments can also provide quality trends or trending data, including generation of sprint-wise trends based on the above metrics, and trend analysis based on the quality of builds and the costs of build failures.

As described above, the various example embodiments can automate many of the steps in the SDLC. These automated steps can include: automated user interface (UI) style testing, automated static and security code analysis, automated unit test case generation, automated API test code generation, automated API documentation, automated test data generation, automated regression and performance tests, automated build verification tests, test execution results, and automated API testing. It will be apparent to those of ordinary skill in the art in view of the disclosure herein that other steps of the SDLC can also be similarly automated.

Figure 2:
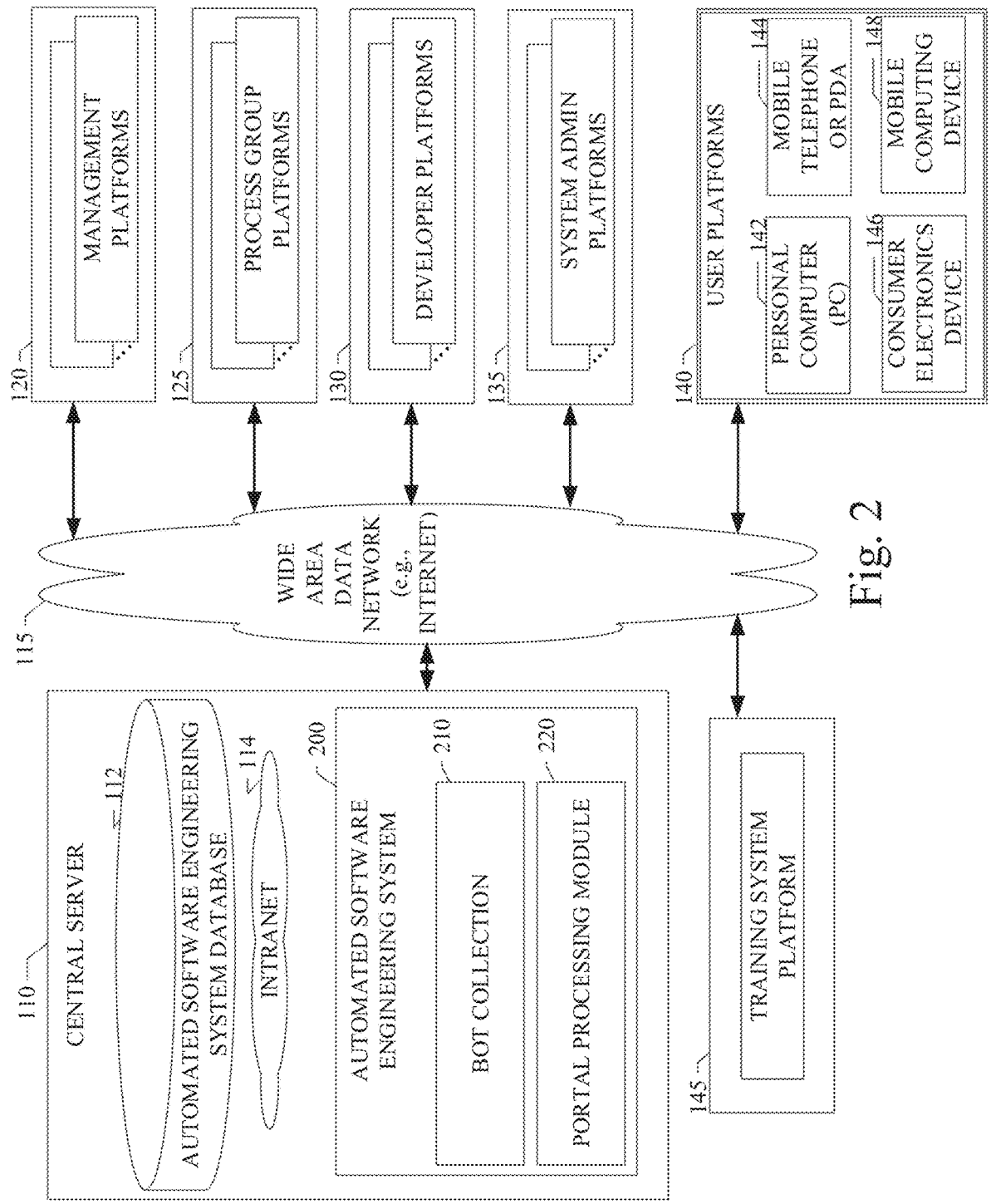
FIG. 2 illustrates an example embodiment of a networked system in which various embodiments may operate.

Referring now to FIG. 2 in an example embodiment, an automated software engineering system 200 can be implemented as described herein to support the automation of the SDLC. In the example embodiment, the automated software engineering system 200 can include the collection of automated processing modules or bots 210 as described above. Additionally, the automated software engineering system 200 can include a portal processing module 220 to provide user interfaces, dashboards, administrative controls, and interfaces for controlling the bots of the bot collection 210 of the automated software engineering system 200.

In the example embodiment as shown in FIG. 2, the automated software engineering system 200 can be deployed on a central server or host site (e.g., a website) 110 to provide a system and method for automated software engineering. For many on-site projects, a shared server (not shown) can be provided and interfaced with central server 110. For off-site projects, such as client Offshore Development Centers (ODCs), a deployment in the client environment, such as an application (app), can be provided and interfaced with central server 110. To remove the app installation complexity, a containerized application can be provided to the client, which can be readily set up. Users at the client sites (120, 125, 130, 135, and 140) can be provisioned with and can provide the credentials to access the app and/or the server 110. All configuration for tools can be managed via a user interface. Users can have the option to view app metrics data based on their user roles. In various example embodiments, the automated software engineering system 200 can be hosted by the host site 110 for a networked user at any of the client sites (120, 125, 130, 135, and 140), wherein any of the client sites (120, 125, 130, and 135) can be implemented as a user platform 140. The details of the automated software engineering system 200 and client sites (120, 125, 130, 135, and 140) for an example embodiment are provided below.

Figure 3:
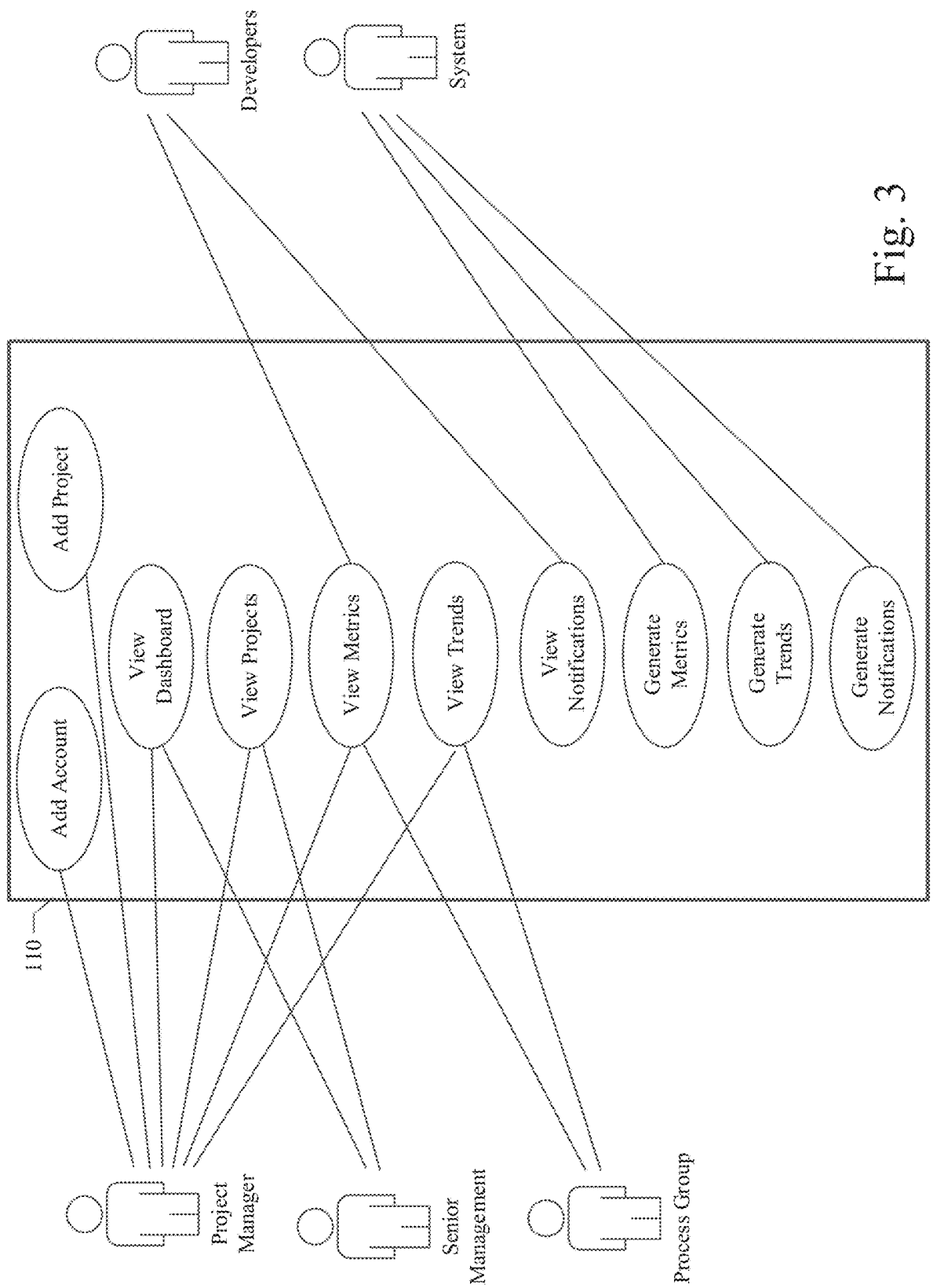
FIG. 3 illustrates a use case of an example embodiment wherein several types of users may interact with the automated software engineering system.

Referring again to FIG. 2 and to FIG. 3, the automated software engineering system 200 can be in network communication with a plurality of client sites (120, 125, 130, 135, and 140). These client sites can include management platforms 120, process group platforms 125, developer platforms 130, or system administrative platforms 135. The management platforms 120 can include access portals for project managers or senior management personnel to create new accounts or projects and to view the status metrics and trends of on-going software development projects. The process group platforms 125 can include access portals for process group managers to view the status metrics and trends of relevant SDLC processes of on-going software development projects. The developer platforms 130 can include access portals for software development personnel to view the status metrics and notifications of relevant SDLC software development tasks of on-going software development projects. The system administrative platforms 135 can include access portals for system administrative personnel to cause the generation of status metrics, trend data, and notifications for on-going software development projects.

The automated software engineering system 200 can be configured to provide data communications for the user platforms 140 serving as networked platforms for project managers and senior management at management platforms 120, process group coordinators at process group platforms 125, software developers at developer platforms 130, and system administrators at system administrative platforms 135. The automated software engineering system 200 can provide SDLC information in a digital or computer-readable form to these user platforms 140 via the network 115. The automated software engineering system 200 be also be configured to provide data communications for the training system platforms 145 to enable the networked usage, transfer, or downloading of the bot collection 210. The bot collection 210 may initially reside with a training system platform 145 or may be downloaded to or from the host site 110. In other words, the bot collection 210 may be trained, tested, used, transferred, or uploaded to the host site 110 and the automated software engineering system 200 therein via the network 115.

One or more of the management platforms 120, the process group platforms 125, the developer platforms 130, and the system administrative platforms 135 can be provided by one or more third party SDLC contributors operating at various locations in a network ecosystem. The host site 110, management platforms 120, process group platforms 125, the developer platforms 130, and the system administrative platforms 135 can be implemented from a variety of different types of client devices, such as user platforms 140. The user platforms 140 may communicate and transfer data and information in the data network ecosystem shown in FIG. 2 via a wide area data network (e.g., the Internet) 115. Various components of the host site 110 can also communicate internally via a conventional intranet or local area network (LAN) 114.

Networks 115 and 114 are configured to couple one computing device with another computing device. Networks 115 and 114 may be enabled to employ any form of computer readable media for communicating information from one electronic device to another. Network 115 can include the Internet in addition to LAN 114, wide area networks (WANs), direct connections, such as through a universal serial bus (USB) port, other forms of computer-readable media, or any combination thereof. On an interconnected set of LANs, including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those of ordinary skill in the art. Furthermore, remote computers and other related electronic devices can be remotely connected to either LANs or WANs via a wireless link, WiFi, Bluetooth™, satellite, or modem and temporary telephone link.

The management platforms 120, process group platforms 125, developer platforms 130, and system administrative platforms 135 may produce and consume any of a variety of network transportable digital data. The network transportable digital data can be transported in any of a family of file formats and associated mechanisms usable to enable a host site 110 to exchange data with the management platforms 120, the process group platforms 125, the developer platforms 130, and the system administrative platforms 135.

In a particular embodiment, a user platform 140 with one or more client devices enables a user to access data provided by the automated software engineering system 200 via the host 110 and network 115. Client devices of user platform 140 may include virtually any computing device that is configured to send and receive information over a network, such as network 115. Such client devices may include portable devices 144, such as, cellular telephones, smart phones, camera phones, display pagers, radio frequency (RF) devices, infrared (IR) devices, global positioning devices (GPS), Personal Digital Assistants (PDAs), handheld computers, wearable computers, tablet computers, integrated devices combining one or more of the preceding devices, and the like. The client devices may also include other computing devices, such as personal computers 142, multiprocessor systems, microprocessor-based or programmable consumer electronics, network PC's, and the like. The client devices may also include other processing devices, such as consumer electronic (CE) devices 146 and/or mobile computing devices 148, which are known to those of ordinary skill in the art. As such, the client devices of user platform 140 may range widely in terms of capabilities and features. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and/or send digital information. In other embodiments, mobile devices can be configured with applications (apps) with which the functionality described herein can be implemented.

Referring again to FIG. 2, the automated software engineering system 200 of an example embodiment is shown to include an automated software engineering system database 112. The database 112 can be used to retain a variety of information data sets including, but not limited to, software module information, metadata, provenance and versioning information, status, metrics, change histories, and the like. It will be apparent to those of ordinary skill in the art that the automated software engineering system database 112 can be locally resident at the host site 110 or remotely located at other server locations or stored in network cloud storage.

Referring again to FIG. 2, host site 110 of an example embodiment is shown to include the automated software engineering system 200. In an example embodiment, automated software engineering system 200 can include a bot collection 210, and a portal processing module 220. Each of these modules can be implemented as software components executing within an executable environment of automated software engineering system 200 operating on host site 110 or user platform 140. Each of these modules of an example embodiment is described in more detail below in connection with the figures provided herein.

Referring still to FIG. 2, the bot collection 210 can facilitate the automation of various phases of the SDLC as described above. The portal processing module 220 can provide user interfaces, dashboards, administrative controls, and interfaces for controlling the bots of the bot collection 210 of the automated software engineering system 200. The bot collection 210 and the portal processing module 220 can be configured to perform the processing as described in more detail below. The bot collection 210 can be resident at the host site 110, resident at a remote client site, or partially resident on a plurality of user platforms 140. Similarly, the portal processing module 220 can be resident at the host site 110 or partially resident on one or more user platforms 140. The automated software engineering system 200 be configured to provide data communications for the client sites (120, 125, 130, 135, and 140) to enable the networked usage, transfer, or downloading of information, executables, data, metrics, notifications, images, documents, and related data to facilitate the various phases of the SDLC. The components and processes for automating the various phases of the SDLC as embodied in the bot collection 210 and the portal processing module 220 are described in more detail below.

Figure 4:
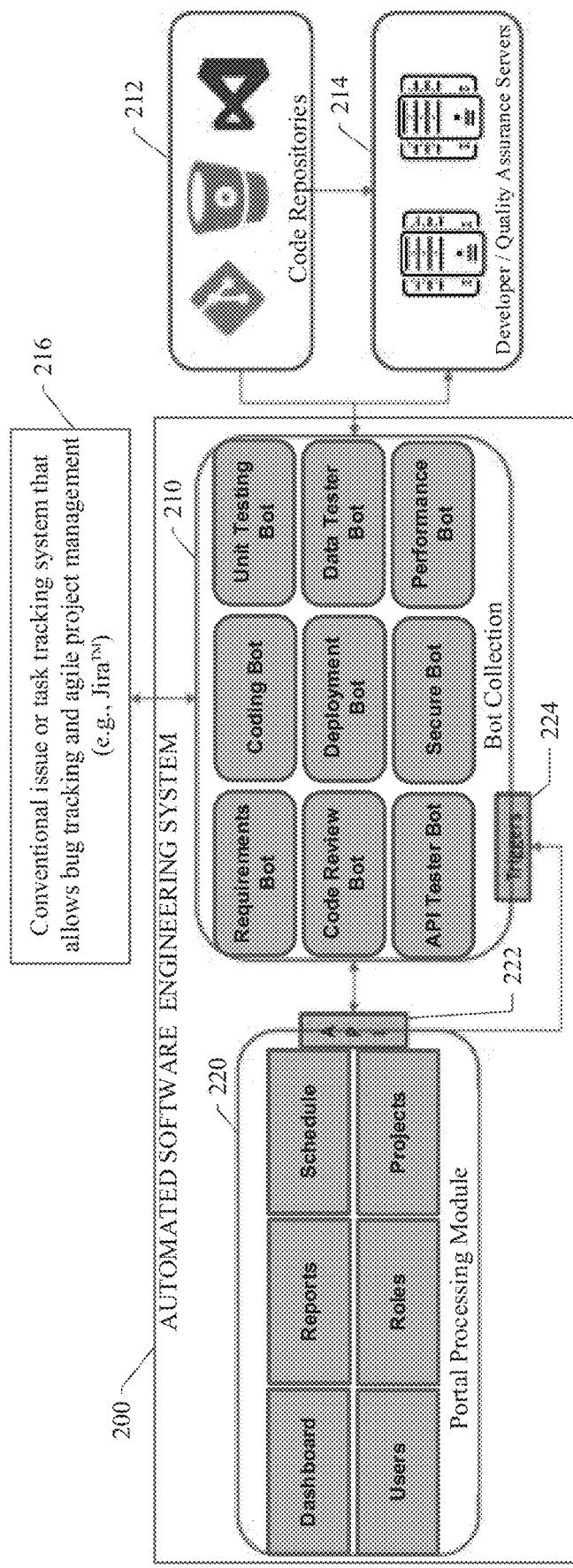
FIG. 4 illustrates an example embodiment showing the interaction between the portal processing module and the bot collection.

FIG. 4 illustrates a framework of an example embodiment of the automated software engineering system 200 that includes the portal processing module 220 and the collection of bots 210. In particular, FIG. 4 illustrates the example embodiment showing the interaction between the portal processing module 220 and the bot collection 210. As shown, an application programming interface (API) 222 enables data communication between the portal processing module 220 and the bot collection 210. In one example embodiment, the portal processing module 220 can use triggers 224 to activate or otherwise control any of the bots of bot collection 210. In other example embodiments, a scheduler or daemon can be used to activate or otherwise control any of the bots of bot collection 210 for execution at a pre-defined time (e.g., daily, weekly, monthly, or on a one-time or repeating custom schedule). As described in more detail below, the portal processing module 220, and the users connected thereto, can drive the various phases of the SDLC and activate any of the bots of bot collection 210 at appropriate times to automate tasks of the various phases of the SDLC. The automated software engineering system 200 can also have access to code repositories 212 and servers, networks, or other computing environments 214 of the code developers and quality assurance (QA) personnel. The software being developed, tested, and deployed by the automated software engineering system 200 can be stored and accessed in the code repositories 212 and servers, networks, or other computing environments 214. Additionally, an example embodiment of the automated software engineering system 200 can include an interface to a conventional issue or task tracking system 216 that allows bug tracking and agile project management (e.g., Jira™). In this manner, the automated software engineering system 200 can automatically create action items or requests resulting from the SDLC processing, wherein the action items can be tasked, tracked, and resolved through the conventional issue or task tracking system 216.

FIGS. 5 through 8 illustrate the processes in various SDLC phases that can be replaced or augmented with a bot of bot collection 210 according to an example embodiment. As described herein, the various example embodiments can automate many of the steps in the SDLC. As illustrated by the dashed boxes shown in FIG. 5, these steps of the conventional SDLC can include: software requirements analysis, software design and coding, software module unit testing, code review, creation of builds and deployment for quality assurance testing, test data generation, application programming interface (API) test generation and API testing, user interface (UI) testing, creation of builds and deployment for internal testing, security profiling, performance profiling, defect correction, regression testing, creation of builds and deployment for production release, and monitoring and alert handling tasks. It will be apparent to those of ordinary skill in the art in view of the disclosure herein that other steps of the SDLC can also be similarly implemented.

Figure 5:
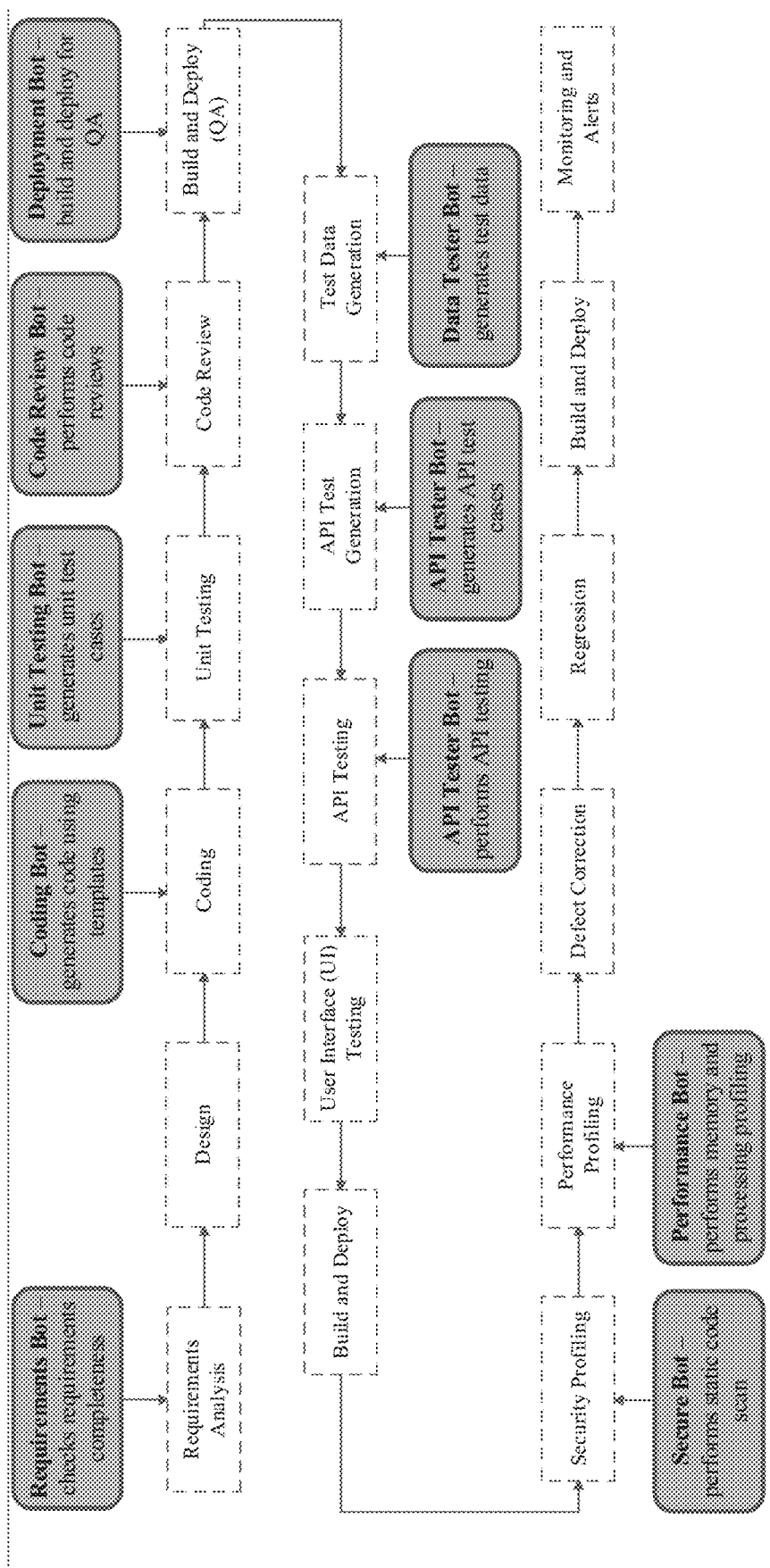
FIG. 5 illustrates an example embodiment showing how the conventional SDLC processes can be integrated with a collection of bots, which span across each phase of the SDLC.

As also illustrated by the solid-line, rounded corner boxes shown in FIG. 5, these steps of the conventional SDLC can be automated or improved by automation using one or more of the bots of bot collection 210. For example, a Requirements Bot of bot collection 210 can be configured to automatically scan a software requirements specification for completeness, consistency, and standards compliance. A Coding Bot can be configured to automatically scan coded software modules for standards compliance, appropriate data definitions, case and branch handing, exception handling, variable or symbol mismatches, parameter range checking, non-initialized variables, and the like. As shown in FIG. 5, a Unit Testing Bot can be configured to generate unit test cases for testing coded software modules. Another bot, a Code Review Bot, can be provided to perform code review and coding style checking on completed software modules. A Deployment Bot can be configured to automatically create software system builds and deployments for QA testing. A Data Tester Bot can be configured to generate test data to test the QA build. An API Tester Bot can be configured to generate API test cases and to perform testing of the API. A Secure Bot can be configured to automatically perform static code scanning on the software build to detect malware. Finally, as shown in FIG. 5, a Performance Bot can be configured to perform memory and execution profiling on the software build to determine a level of system performance and efficiency. Other bots can be provided to perform an analysis on completed software modules pertaining to a level of compliance with security standards or practices, proper coding standards, software requirements compliance, regulatory compliance, and the like. In each case, the bots can be configured as rule-based automated processing modules or trained machine learning automated processing modules. The training of the machine learning, neural network, or classifier bots is described in more detail below. The bots supporting each phase of the SDLC can analyse and test completed software modules, builds, and interfaces in serial or in parallel and may be executed around the clock to significantly speed up the automatic validation of the designed, coded, tested, and deployed software system.

In addition, example embodiments can also provide automated software module, deployment, and API documentation, automated test data generation, automated regression and performance testing, automated build verification testing, test execution results, and automated API testing. It will be apparent to those of ordinary skill in the art in view of the disclosure herein that other steps of the SDLC can also be similarly automated. As a result, the example embodiments disclosed herein provide an automated SDLC and an Integrated Development Environment (IDE).

Figure 6:
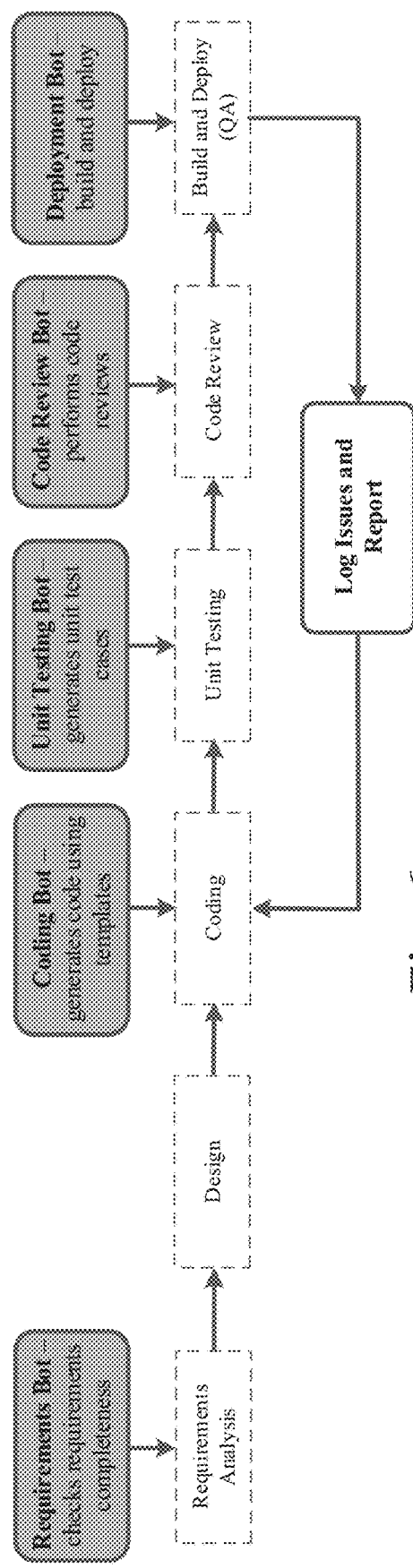
FIGS. 6 through 8 illustrate an example embodiment showing how each phase of the SDLC can be integrated with a collection of bots to automate the design and coding phase of the SDLC.
Figure 7:
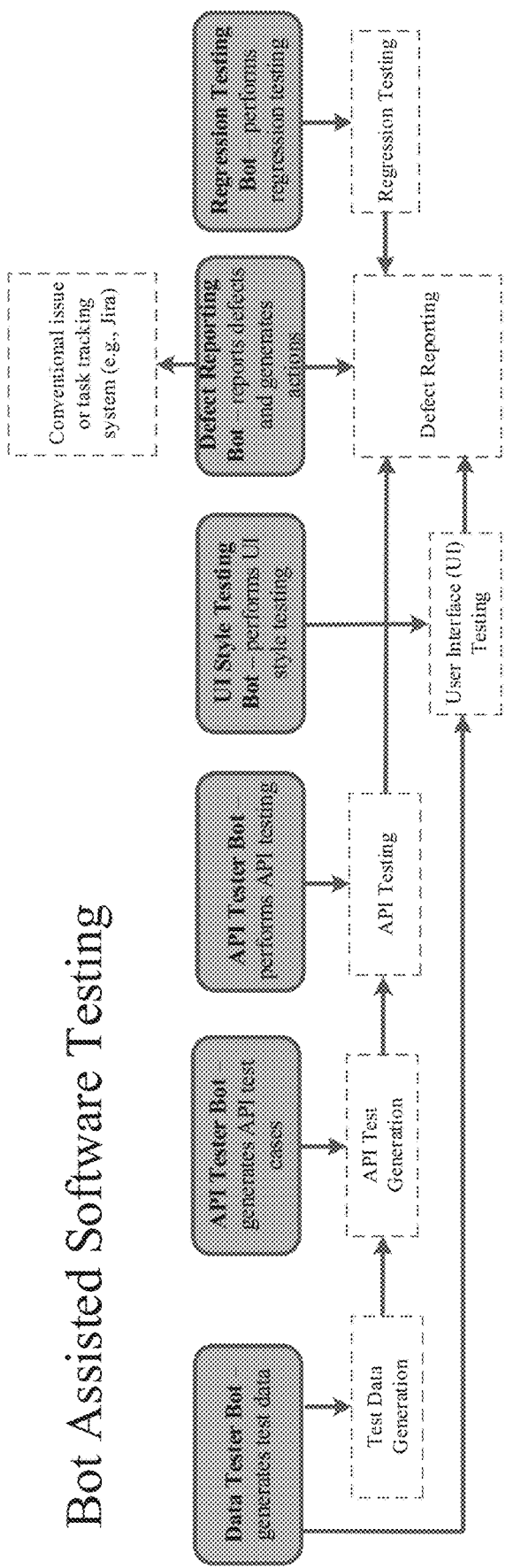
Figure 8:
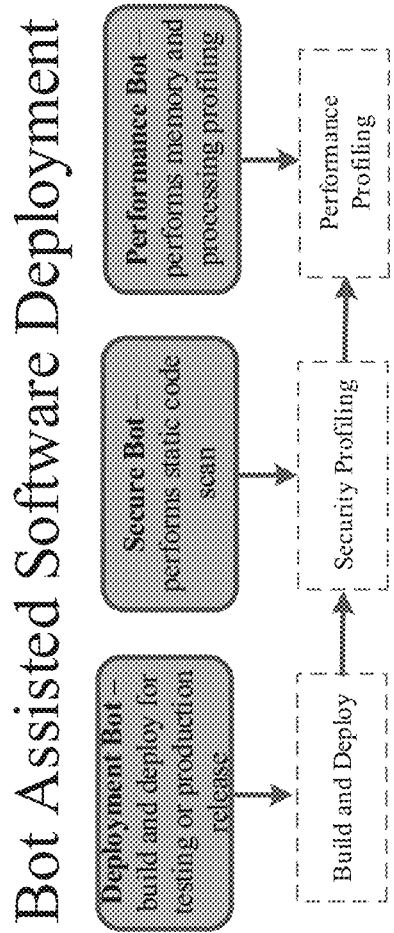

FIGS. 6 through 8 illustrate an example embodiment showing how each phase of the SDLC can be integrated with a collection of bots to automate the design and coding phase of the SDLC. At each step of the design and coding phase, the bots of bot collection 210 can implement the software coding best practices, which include: readability, consistent style, maintainability, unit testability, and code optimization. As shown in FIG. 6, a Requirements Bot of bot collection 210 can be configured to automatically scan a software requirements specification for completeness, consistency, and standards compliance. A Coding Bot can be configured to automatically scan coded software modules for standards compliance, appropriate data definitions, case and branch handing, exception handling, variable or symbol mismatches, parameter range checking, non-initialized variables, and the like. As shown in FIG. 6, a Unit Testing Bot can be configured to generate unit test cases for testing coded software modules. Another bot, a Code Review Bot, can be provided to perform code review and coding style checking on completed software modules. A Deployment Bot can be configured to automatically create software builds and deployments for QA testing. Any issues found during the coding or deployment process can be logged and reported for correction or resolution during the coding process. Thus, as disclosed for the described example embodiments, each of the various phases of the software design and development process can be automated or assisted using one or more bots of the bot collection 210.

Referring to FIG. 7, the bot assisted software testing phase of an example embodiment is illustrated. At each step of the software testing phase, the bots of bot collection 210 can implement the software testing best practices, which include: testing of boundary conditions, testing for non-functional code, testing for complete coverage of cases, generation and use of relevant test data, and adherence to applicable test standards. As shown in FIG. 7, a Data Tester Bot can be configured to generate test data to test a software build. An API Tester Bot can be configured to generate API test cases and to perform testing of the API. A User Interface (UI) Bot can also be configured to perform UI style testing on the software build. A Defect Reporting Bot can be used to automatically collect defect information reported by other bots and to automatically generate action items or task requests using a conventional independent task tracking system (e.g. Jira™) As shown in FIG. 7, a Regression Testing Bot can be configured to perform regression testing on the software build and report any defects to the Defect Reporting Bot. Any issues found during the automatic testing process can be logged and reported for correction or resolution following the testing process. Thus, as disclosed for the described example embodiments, each of the various phases of the software testing process can be automated or assisted using one or more bots of the bot collection 210.

Referring to FIG. 8, the bot assisted software deployment phase of an example embodiment is illustrated. At each step of the software deployment phase, the bots of bot collection 210 can implement the software deployment best practices, which include: branch following, use of code quality tools, functionality tracing, and adherence to software requirements specifications. As shown in FIG. 8, a Deployment Bot can be configured to automatically create software builds and deployments for testing or production release. A Secure Bot can be configured to automatically perform static code scanning on the software build to detect malware. Finally, as shown in FIG. 8, a Performance Bot can be configured to perform memory and execution profiling on the software build to determine a level of system performance and efficiency. Other bots can be provided to perform an analysis on completed software modules pertaining to a level of compliance with security standards or practices, proper coding standards, software requirements compliance, regulatory compliance, and the like. Any issues found during the automatic deployment process can be logged and reported for correction or resolution following the deployment process. Thus, as disclosed for the described example embodiments, each of the various phases of the software deployment process can be automated or assisted using one or more bots of the bot collection 210.

Figure 9:
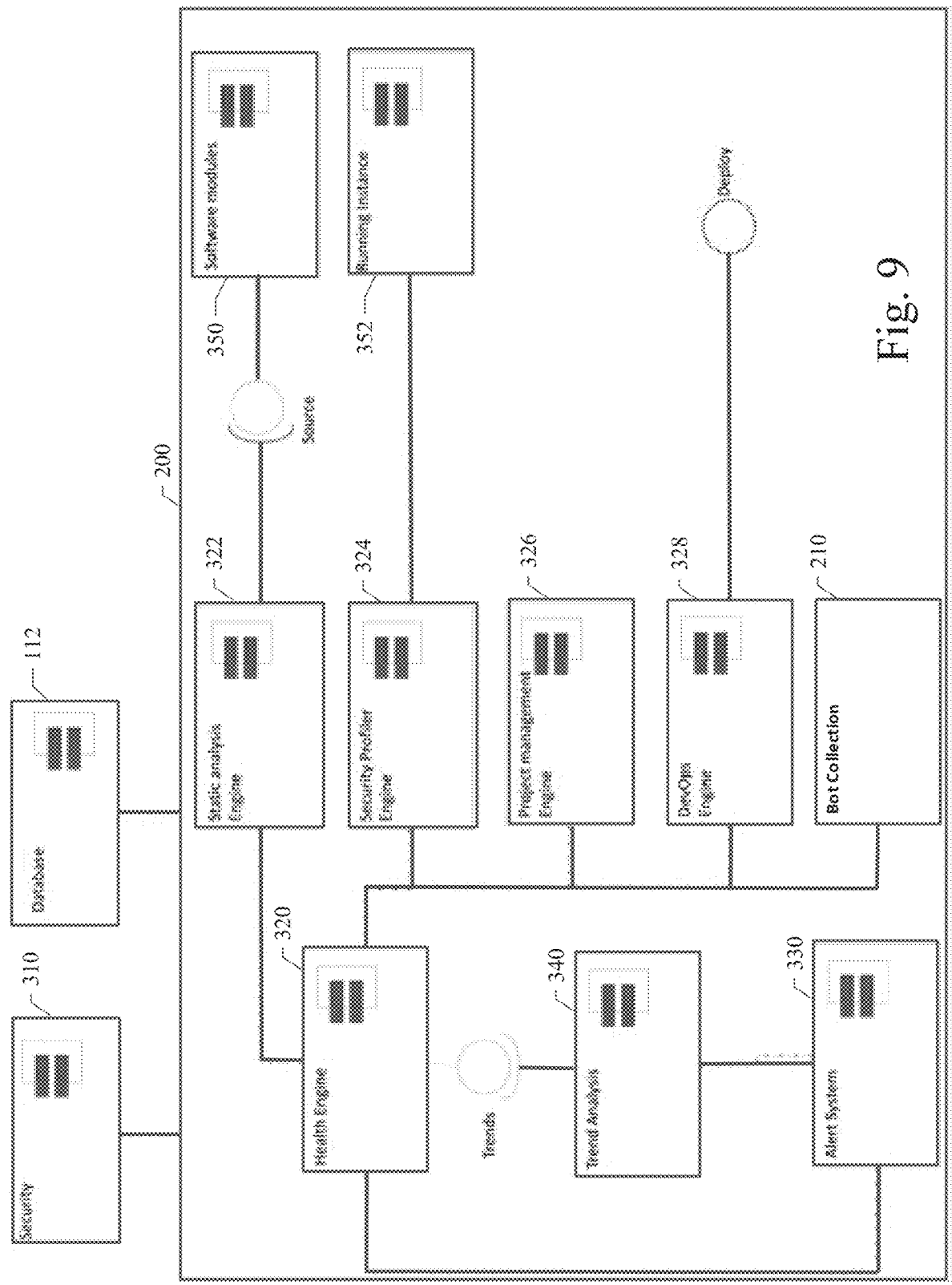
FIG. 9 illustrates an example embodiment showing an implementation architecture of the automated software engineering system.

FIG. 9 illustrates an example embodiment showing an implementation architecture of the automated software engineering system 200. As shown, an example embodiment of the automated software engineering system 200 can be in data communication with automated software engineering system database 112. The database 112 can be used to retain configuration parameters, user account information, system data structures, and the like. The automated software engineering system 200 can also be in data communication with a security system 310 to provide security adherence, malware detection/removal, firewalls, and the like. The automated software engineering system 200 of the example embodiment can be configured to include a health engine module 320, static analysis engine 322, security profiler engine 324, project management engine 326, and a development operations or deployment engine 328. Each of the modules/processing engines can be implemented as software components executing within an executable environment of automated software engineering system 200 operating on host site 110 or user platform 140. The automated software engineering system 200 of the example embodiment can also include the bot collection 210 as described above. The health engine module 320 can be configured to activate and monitor the execution of the static analysis engine 322, security profiler engine 324, project management engine 326, the development operations or deployment engine 328, and any of the bots in the bot collection 210. The static analysis engine 322, security profiler engine 324, project management engine 326, and the development operations or deployment engine 328 can also activate any of the bots in the bot collection 210 for automated processing tasks. The static analysis engine 322 can access software modules in a repository 350 to perform various analysis tasks on the stored software modules. These analysis tasks can include static code scanning of the software modules to detect malware. The analysis tasks can also include the requirements review and code reviews as described above. The static analysis engine 322 can use any of the bots in the bot collection 210 to automatically accomplish these analysis tasks. The security profiler engine 324 can access and monitor a running instance 352 of a software module and perform an analysis of the executing module. This analysis can include security profiling, unit testing, data testing, API testing, and any of the testing or code analysis operations described above. The security profiler engine 324 can use any of the bots in the bot collection 210 to automatically accomplish this analysis. The project management engine 326 can be configured to manage the sequence of processing operations necessary to complete the code review, testing, and deployment tasks for a particular project. The project management engine 326 can marshal the processing operations of any of the static analysis engine 322, the security profiler engine 324, the development operations or deployment engine 328, and any of the bots in the bot collection 210 to complete the code review, testing, and deployment for a particular software engineering project. The development operations or deployment engine 328 handles the deployment tasks for a reviewed and tested software system. The development operations or deployment engine 328 can use any of the bots in the bot collection 210 to automatically accomplish the software system deployment.

As part of its processing operations, the health engine module 320 can monitor the execution of the other modules and processing engines of the automated software engineering system 200. In the case of errors, exceptions, or other problems detected in or by any of these modules and processing engines, the health engine module 320 can use alert system 330 to automatically notify appropriate system users or processing nodes, or to post error reports to an error log or execution metrics log. These logs can be analysed by a trend analysis module 340 to determine if there are notable trends occurring in the execution of the automated software engineering system 200.

Figure 10:
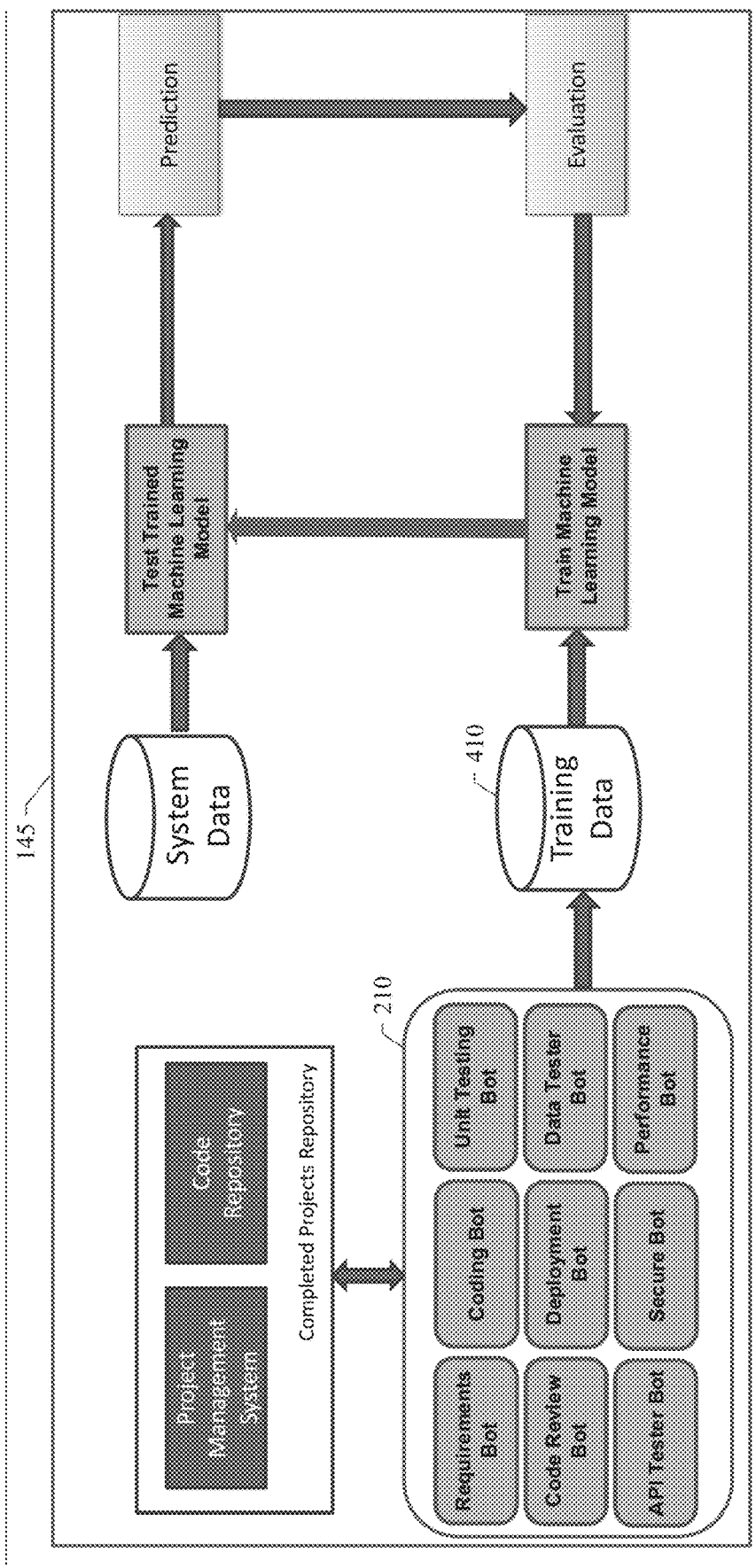
FIG. 10 illustrates an example embodiment showing a process for training the collection of bots.

FIG. 10 illustrates an example embodiment showing a training system platform 145 and a process for training each of the bots in the collection of bots 210. As described above, each of the bots in the collection of bots 210 can be implemented using machine learning techniques, trained deep neural networks, classifiers, or other types of trainable execution models. These types of trainable execution models require that the models be initial trained using applicable training data sets to cause the models to converge on results in a desired manner. As shown in FIG. 10, any of the bots in the bot collection 210 can be machine learning models trained using training data 410. The training data 410 can be sample code portions, sample test data, interface data, performance or metrics data, or the like. The trained machine learning models can be tested using applicable system data to produce predicted or desired output. The output of each model is evaluated and the model is re-trained until the output of the trained machine learning model is within an acceptable range of a desired or predicted output. At that point, the trained machine learning model can be retained in the bot collection 210 and marked for operational use by the automated software engineering system 200 in a real-time scenario.

Figure 11:
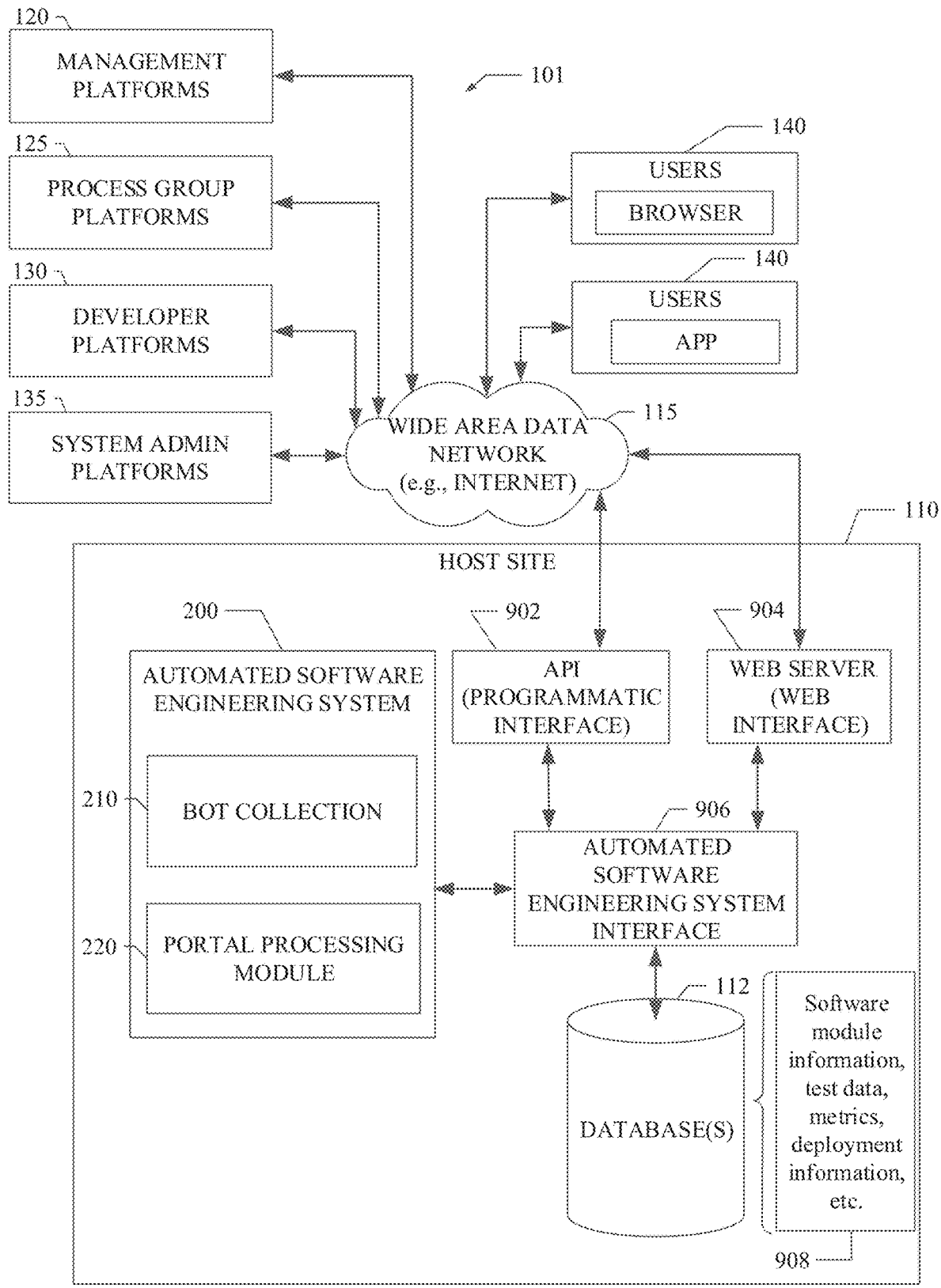
FIG. 11 illustrates another example embodiment of a networked system in which various embodiments may operate.

Referring now to FIG. 11, another example embodiment 101 of a networked system in which various embodiments may operate is illustrated. In the embodiment illustrated, the host site 110 is shown to include the automated software engineering system 200. The automated software engineering system 200 is shown to include the bot collection 210 and the portal processing module 220, as described above. In a particular embodiment, the host site 110 may also include a web server 904, having a web interface with which users may interact with the host site 110 via a user interface or web interface. The host site 110 may also include an application programming interface (API) 902 with which the host site 110 may interact with other network entities on a programmatic or automated data transfer level. The API 902 and web interface 904 may be configured to interact with the automated software engineering system 200 either directly or via an interface 906. The automated software engineering system 200 may be configured to access a data storage device 112 either directly or via the interface 906.

Figure 12:
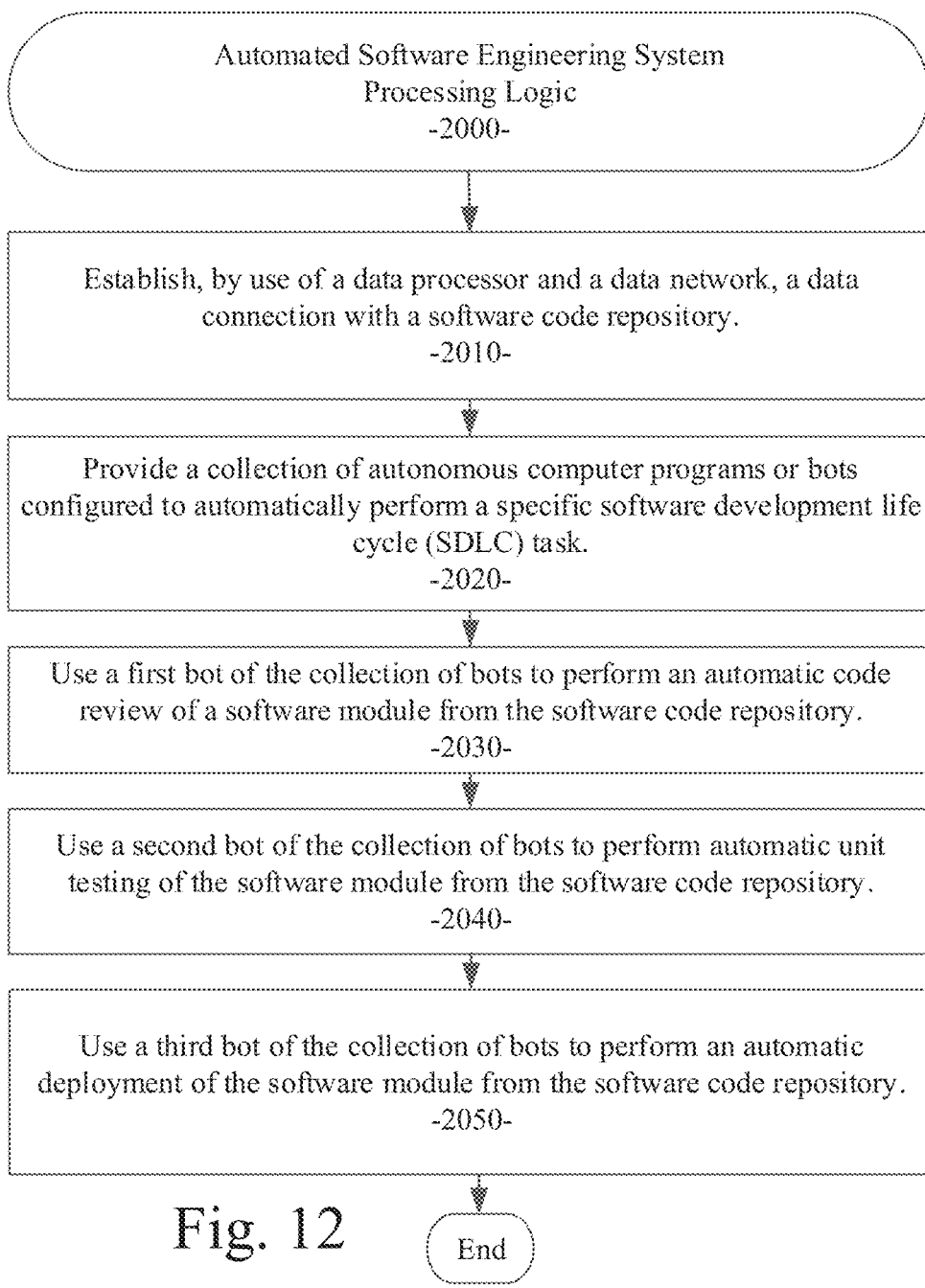
FIG. 12 illustrates a processing flow diagram that illustrates an example embodiment of a method as described herein.

Referring now to FIG. 12, a processing flow diagram illustrates an example embodiment of a method implemented by the automated software engineering system 200 as described herein. The method 2000 of an example embodiment includes: establishing, by use of a data processor and a data network, a data connection with a software code repository (processing block 2010); providing a collection of autonomous computer programs or bots configured to automatically perform a specific software development life cycle (SDLC) task (processing block 2020); using a first bot of the collection of bots to perform an automatic code review of a software module from the software code repository (processing block 2030); using a second bot of the collection of bots to perform automatic unit testing of the software module from the software code repository (processing block 2040); and using a third bot of the collection of bots to perform an automatic deployment of the software module from the software code repository (processing block 2050).

Figure 13:
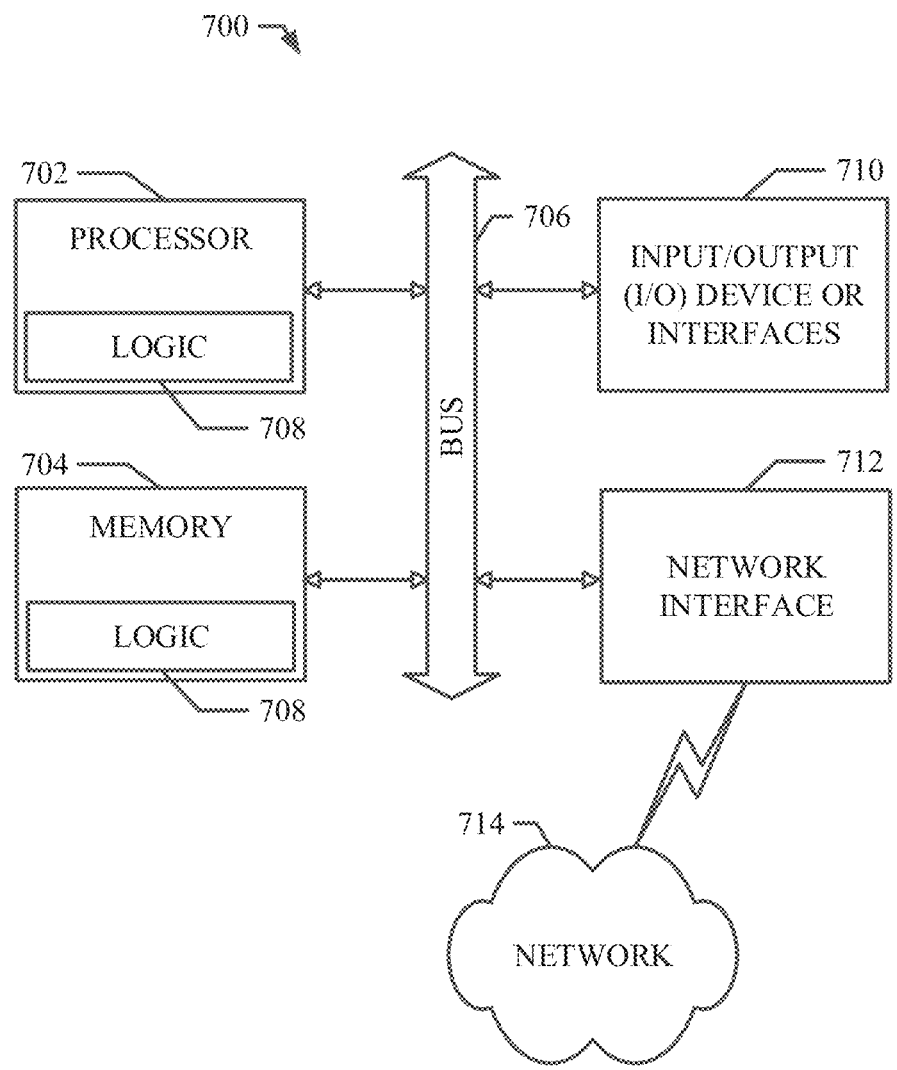
FIG. 13 shows a diagrammatic representation of a machine in the example form of a computer system within which a set of instructions when executed may cause the machine to perform any one or more of the methodologies discussed herein.

FIG. 13 shows a diagrammatic representation of a machine in the example form of a mobile computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a mobile device, a web appliance, a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication mechanisms by which information may travel between the mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that stores the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

As described herein for various example embodiments, a system and method for automated software engineering are disclosed. In the various example embodiments described herein, a computer-implemented tool or software application (app) as part of an automated software engineering system is described to automate and improve the SDLC. As such, the various embodiments as described herein are necessarily rooted in computer and network technology and serve to improve these technologies when applied in the manner as presently claimed. In particular, the various embodiments described herein improve the use of servers or mobile device technology and data network technology in the context of automated software engineering via electronic means.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:
   establishing, by use of a data processor and a data network, a data connection with a software code repository;
   providing a collection of autonomous computer programs or bots configured to automatically perform a specific software development life cycle (SDLC) task;
   using a first bot of the collection of bots to perform an automatic code review of a software module from the software code repository, wherein the first bot is a trainable execution model trained with sample code portions;
   using a second bot of the collection of bots to perform automatic unit testing of the software module from the software code repository, wherein the second bot is a trainable execution model trained with sample test data, the first and second bots being trained using training data until the first and second bots produce predicted or desired output based on an evaluation of an output of each of the first and second bots after training; and
   using a third bot of the collection of bots to perform an automatic deployment of the software module from the software code repository.

2. The method of claim 1 further including using a fourth bot of the collection of bots to automatically scan a software requirements specification for completeness, consistency, and standards compliance.

3. The method of claim 1 further including using the first bot of the collection of bots to automatically scan the software module for standards compliance, appropriate data definitions, case and branch handing, exception handling, variable or symbol mismatches, parameter range checking, and non-initialized variables.

4. The method of claim 1 further including using the second bot of the collection of bots to automatically generate unit test cases for testing the software module.

5. The method of claim 1 further including using a fifth bot of the collection of bots to automatically generate application programming interface (API) test cases and to perform testing of the API.

6. The method of claim 1 further including using a sixth bot of the collection of bots to automatically create software system builds.

7. The method of claim 1 further including collecting defect information reported by a seventh bot of the collection of bots and to automatically generate action items or task requests using an independent task tracking system.

8. The method of claim 1 including generating status metrics and notifications for on-going software development projects.

9. The method of claim 1 including training the third bot using training data until the third bot produces predicted or desired output.

10. A system comprising:
    a data processor;
    a network interface, in data communication with the data processor, for communication on a data network; and
    an automated software engineering system, executable by the data processor, to:
      establish, by use of the data processor and the data network, a data connection with a software code repository;
      provide a collection of autonomous computer programs or bots configured to automatically perform a specific software development life cycle (SDLC) task;
      use a first bot of the collection of bots to perform an automatic code review of a software module from the software code repository, wherein the first bot is a trainable execution model trained with sample code portions;
      use a second bot of the collection of bots to perform automatic unit testing of the software module from the software code repository, wherein the second bot is a trainable execution model trained with sample test data, the first and second bots being trained using training data until the first and second bots produce predicted or desired output based on an evaluation of an output of each of the first and second bots after training; and
      use a third bot of the collection of bots to perform an automatic deployment of the software module from the software code repository.

11. The system of claim 10 being further configured to use a fourth bot of the collection of bots to automatically scan a software requirements specification for completeness, consistency, and standards compliance.

12. The system of claim 10 being further configured to use the first bot of the collection of bots to automatically scan the software module for standards compliance, appropriate data definitions, case and branch handing, exception handling, variable or symbol mismatches, parameter range checking, and non-initialized variables.

13. The system of claim 10 being further configured to use the second bot of the collection of bots to automatically generate unit test cases for testing the software module.

14. The system of claim 10 being further configured to use a fifth bot of the collection of bots to automatically generate application programming interface (API) test cases and to perform testing of the API.

15. The system of claim 10 being further configured to use a sixth bot of the collection of bots to automatically create software system builds.

16. The system of claim 10 being further configured to collect defect information reported by a seventh bot of the collection of bots and to automatically generate action items or task requests using an independent task tracking system.

17. The system of claim 10 being further configured to generate status metrics and notifications for on-going software development projects.

18. The system of claim 10 being further configured to train the third bot using training data until the third bot produces predicted or desired output.

19. A non-transitory machine-useable storage medium embodying instructions which, when executed by a machine, cause the machine to:

establish, by use of the data processor and the data network, a data connection with a software code repository;

provide a collection of autonomous computer programs or bots configured to automatically perform a specific software development life cycle (SDLC) task;

use a first bot of the collection of bots to perform an automatic code review of a software module from the software code repository, wherein the first bot is a trainable execution model trained with sample code portions;

use a second bot of the collection of bots to perform automatic unit testing of the software module from the software code repository, wherein the second bot is a trainable execution model trained with sample test data, the first and second bots being trained using training data until the first and second bots produce predicted or desired output based on an evaluation of an output of each of the first and second bots after training; and use a third bot of the collection of bots to perform an automatic deployment of the software module from the software code repository.

20. The non-transitory machine-useable storage medium of claim 19 wherein the first and second bots are implemented as trained deep neural networks or classifiers.

* * * * *